United States Patent
Samson

(10) Patent No.: US 8,318,227 B2
(45) Date of Patent: Nov. 27, 2012

(54) COOKING ACCESSORY AND METHOD

(76) Inventor: Ilan Zadik Samson, London (GB)

( * ) Notice: Subject to any disclaimer, the term of this patent is extended or adjusted under 35 U.S.C. 154(b) by 1069 days.

(21) Appl. No.: 12/138,171

(22) Filed: Jun. 12, 2008

(65) Prior Publication Data

US 2009/0311396 A1 Dec. 17, 2009

(51) Int. Cl.
*A47J 43/28* (2006.01)
*A47J 43/00* (2006.01)
*B01D 17/00* (2006.01)
*A23L 1/015* (2006.01)

(52) U.S. Cl. ........ 426/417; 426/490; 210/175; 210/774; 99/495

(58) Field of Classification Search ................. 426/417, 426/490; 210/175, 774; 99/495
See application file for complete search history.

(56) References Cited

U.S. PATENT DOCUMENTS

| | | | | |
|---|---|---|---|---|
| 3,623,630 A | * | 11/1971 | Rode | 220/573.1 |
| 3,773,212 A | * | 11/1973 | Sekuler | 220/575 |
| 3,854,023 A | * | 12/1974 | Levinson | 219/730 |
| 4,024,057 A | * | 5/1977 | McCoy | 210/774 |
| D265,157 S | * | 6/1982 | McKeegan | D7/549 |
| D326,742 S | * | 6/1992 | Tart | D30/130 |
| D335,940 S | * | 5/1993 | McGrath et al. | D30/130 |
| 5,372,063 A | * | 12/1994 | Berg | 100/110 |
| 5,577,461 A | * | 11/1996 | Sebastian et al. | 119/51.5 |
| D603,659 S | * | 11/2009 | Jalet | D7/637 |
| 2010/0012597 A1 | * | 1/2010 | David et al. | 210/774 |

* cited by examiner

*Primary Examiner* — Henry Yuen
*Assistant Examiner* — Jianying Atkisson
(74) *Attorney, Agent, or Firm* — Chernoff Vilhauer McClung & Stenzel LLP

(57) ABSTRACT

A method and apparatus are disclosed for removing fat floating on hot soup. A thermally conducting plate 14 having a flat underside is cooled to a temperature below that at which the flat solidifies and lowered onto the floating fat to cause the fat to congeal and adhere to its underside. The plate 14 is then raised to remove the adhering fat from the soup, and the fat adhering to the underside is scraped off by dragging the underside across a straight edge 22.

4 Claims, 1 Drawing Sheet

COOKING ACCESSORY AND METHOD

FIELD OF THE INVENTION

The present invention relates to a method and apparatus for removing fat floating on hot soup or gravy.

BACKGROUND OF THE INVENTION

When boiling pieces of meat or chicken, to make a soup, gravy, or a consommé, fat from the animal floats to the surface. For health and culinary reasons, this fat needs to be skimmed off. Removing the fat by means of a spoon or ladle is difficult and inefficient, resulting in some fat remaining in the soup and much of the soup being wasted. Special fat-separating jugs exist, but these involve a messy transfer of the liquids from the cooking vessel into the jug.

In U.S. Pat. No. 4,024,057 there are disclosed a device for removing liquid grease from solutions, such as soups and broths, and a method for using the device. The grease removing device includes a flat plate having a multiplicity of projections on its underside. A container for holding coolant and a handle are also provided. In use, the plate is cooled to a temperature lower than the freezing point of the grease; the underside of the plate is then brought into contact with the floating grease; and the plate with the attached solidified grease is then removed from the solution.

Because of the poor thermal conductivity of the fat, once a thin layer has congealed on the plate its efficiency is severely reduced. It is not therefore usually possible to remove all the fat in one operation. Instead, it is necessary to remove the fat adhering to the underside of the plate and to repeat the operation several times. For this reason, it is important to be able to remove the fat from the underside of the plate quickly and easily.

SUMMARY OF THE INVENTION

In accordance with a first aspect of the present invention a method of removing fat floating on hot soup which comprises providing a thermally conducting plate having a flat underside, cooling the plate to a temperature below that at which the fat solidifies, lowering the plate onto the floating fat to cause the fat to congeal and adhere to the underside of the plate, raising the plate to remove the adhering fat from the soup, and scraping off the fat adhering to the underside by dragging the underside across a straight edge.

U.S. Pat. No. 4,024,057 tried to maximize the surface area of the underside of the cooled plate by providing projections on it. This marginally increased the surface area to which the fat can adhere but was not sufficient to remove all the fat in one operation. It therefore remained necessary in some way to remove the fat from the cooled plate and to repeat the operation. However, the projections on the underside interfered with mechanical removal of the fat. The alternative proposed in the latter patent, namely that of heating the plate to melt the fat, is not practical as it would take too long, aside from making inefficient use of energy. It is believed that these are amongst the reasons why, despite having been in existence for more than thirty years, the device of U.S. Pat. No. 4,024,057 has not enjoyed any commercial success.

In contrast with the teaching of U.S. Pat. No. 4,024,057, the underside of the cooled plate in the present invention has no projections and is flat. Because of this, any fat adhering to it can be scraped off by simply dragging the underside across a straight edge. At the same time, the fat can be collected in a container without mess and at the end of the task the plate can readily be wiped clean.

While intended primarily for its application in cooking, it will be appreciated that the invention can be used to separate any two immiscible liquids of which one has a lower density than the other and freezes or solidifies at a higher temperature than the other. The terms "fat" and "soup", which will continue to be used in the specification, should according be viewed broadly to include any materials having the appropriate physical properties to enable them to be separated in this manner. Furthermore, the term "hot" includes any temperature above the melting point of the floating material.

Preferably, the plate is formed by the base of a vessel and the cooling of the plate is effected by placing ice within the vessel. Here the term "ice", should be taken to include any solid having a freezing point similar to that of the soup.

Following its removal from the soup, the layer of congealed fat adhering to the underside of the plate is removed by dragging the underside over a sharp edge to scrape away the adhering fat. The process may then be repeated until substantially all the fat is removed without wasting any of the soup.

It would be possible to cool the plate by placing it in a freezer prior to use but this is not preferred for two reasons. First, it is possible that the soup may freeze as well as the fat. A second and more serious reason is that the low thermal capacity of the plate and its low specific heat would result in its heating up and rapidly becoming ineffective.

In the preferred embodiment of the invention, the sustained ability to cool and solidify the fat derives from the latent heat of melting of the ice, which can readily be replenished as necessary.

In a second aspect of the invention, there is provided an apparatus for removing fat floating on hot soup, comprising a vessel capable of containing ice and having a thermally conducting base, wherein the base has a flat underside and a stand is provided for the vessel, the stand including an upstanding wall with a straight upper edge over which the underside of the base of the vessel can be scraped to remove any congealed fat adhering to the underside and a container for collecting fat removed from the underside.

Preferably, the container may have a sidewall and two upstanding walls of greater height than the sidewall extending from the base of the container on which the underside of the vessel may be scraped and on which the vessel may rest in a horizontal attitude.

The side edges of the upstanding walls are preferably spaced from the sidewall of the container to leave a free passage through which liquid may flow.

The sidewall may advantageously also have at least one pouring lip so that liquid collected in the container may be tipped out cleanly and without spillage.

The vessel may have a thermally insulated handle but it is preferred to form the sidewall of the vessel from an insulating material.

Conveniently, the sidewall of the vessel is formed of a plastics material that is secured to a metal plate constituting the base, the plate preferably being formed of aluminum.

The sidewall may be formed of one part, or two separately formed parts that are assembled to one another and on to the base plate and suitably sealed relative to each other and the base plate. Alternatively, in situ molding may be used to mould the metal base plate and the plastics sidewall of the vessel in one piece.

To allow the cooled base of the vessel to reach to the edge of the pan containing the soup, it is preferred that along at least part of the periphery of the vessel the base should project at least as far as and preferably beyond the sidewall of the vessel. It is also preferable for the base to remain flat all the way to its edge and for the edge not to flare out on its way up.

It is advantageous for the periphery of the base to be curved and non-circular so as to present edges with different radii of curvature. This allows the base to reach close to the walls of a variety of soup containers so most of the floating fat may be successfully removed.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
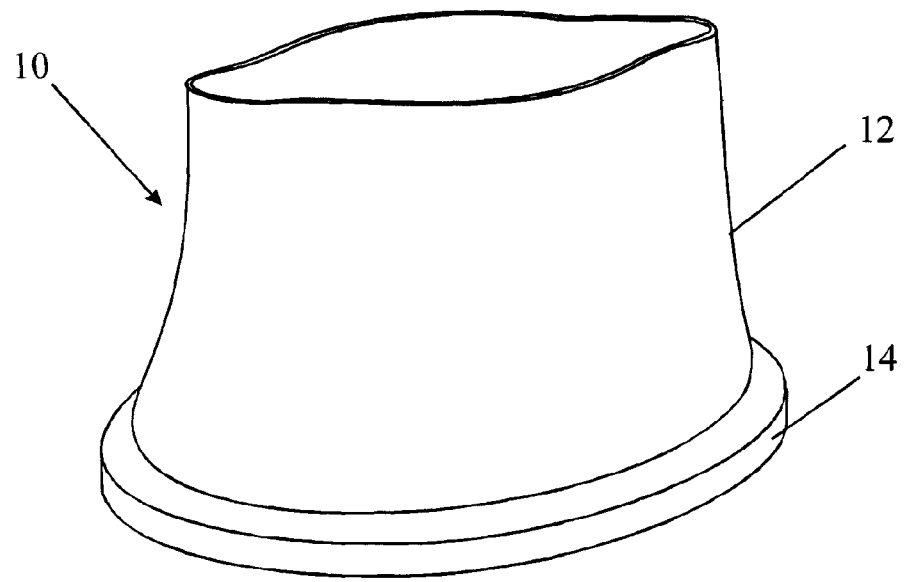
FIG. 1 is a perspective view of a hand held vessel for removing fat floating on hot soup.

FIG. 1 shows a vessel 10 having a shaped sidewall 12 made of a plastics material and an aluminum base 14 of which the periphery extends beyond the sidewall 12. The top of the vessel is designed and dimensioned so that it can be held between the fingers and thumb of one hand and so that it can be rotated by movement of the thumb as well as by rotation of the wrist. The base 14 has a curved non-circular periphery so that it can pushed close to the wall of any pan, regardless of radius of curvature.

Figure 2:
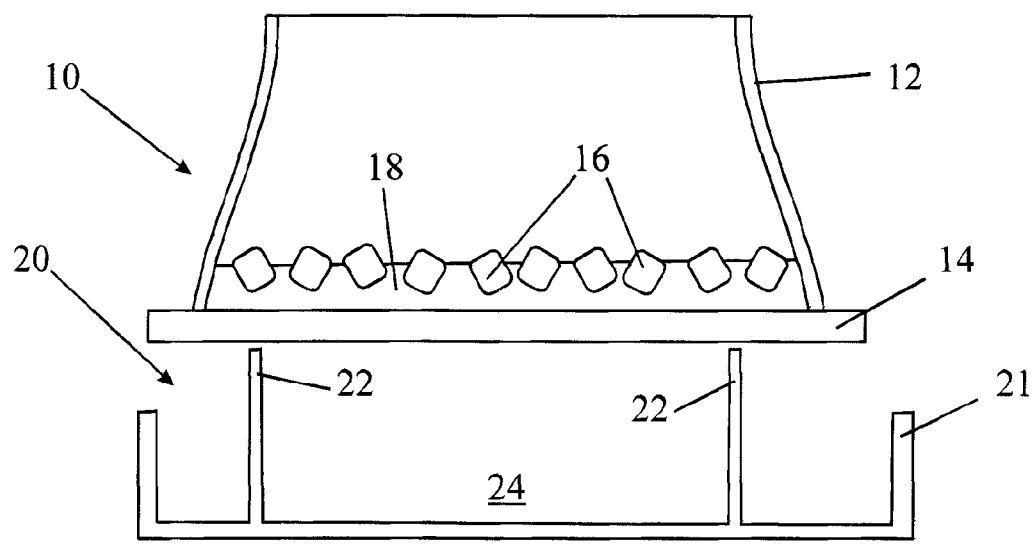
FIG. 2 is a section showing the vessel of FIG. 1 resting on its stand.

In use, some ice 16, e.g. cubes, is placed inside the vessel 10, as shown in FIG. 2, and lowered onto the fat floating on hot soup in a pan. On contact with the base 14, the fat cools, congeals and sticks to the flat underside of the base 14. The heat of the fat melts some of the ice, but the molten ice 18 is still at the same temperature as the solid ice 16 and continues to cool any fat with which the base comes into contact. The heat given off by the fat acts as the latent heat of melting of the ice so that the base 14 remains cools for a reasonable time. Should the base 14 cease to be effective in picking up fat, it is only necessary to replenish the ice in the vessel.

Once the fat has adhered to the base 14, raising the vessel 10 will remove the fat without removing any of the soup. The underside of the base 14 is scraped over a straight edge to remove the fat and the process repeated until most of the fat is removed from the soup.

Once the vessel 10 has been used to pick up fat from soup, it would soil a work surface if set down on it. The vessel cannot be placed on its side, as the liquid and ice within it would spill out. It is therefore provided with a stand 20 as shown in FIG. 2. The stand has at least one but preferably two upstanding walls 22 on which the vessel 10 can rest and over which its underside can be dragged. Fat scraped off the base 14 of the vessel 10 collects in a container 24 forming part of the stand. The walls 22 or at least their upper edges could be made of an elastomer in order to conform to the shape of the underside of base 14 to act as a squeegee.

The upstanding walls 22 are taller than the sidewall 21 of the container 24 and their side edges are spaced from the sidewall 21. At least one pouring lip is provide on the sidewall 21 so that liquid collected in the container can be tipped out of the container 24, allowing the container to be emptied cleanly and without spillage. The space between the edges of the upstanding walls 22 and the container sidewall 21 ensures that liquid can flow freely towards the pouring lip and that the walls 22 do not act to divide the container 24 into separate non-communicating compartments.

The drawings do not show the manner in which the sidewall 12 of the vessel 10 is secured to the base 14 but the construction of the vessel is not of primary significance to the present invention. The sidewall 12 may be formed in one piece and glued in place or staked or snapped on to a receiving feature on a plate forming the base 14, or it may be formed in two pieces that are secured to one another and to the base. A further possibility is to mould the sidewall 12 in situ onto the base 14.

It is furthermore possible for the sidewall 12 and the base 14 to be formed in one piece of the same material but then an insulating grip should be used to make the vessel comfortable to grip.

Filling a vessel with ice is a convenient and inexpensive way of absorbing large amounts of heat from the floating fat to cause it to congeal but the invention is not restricted to this way of cooling the plate. One could for example resort to an electrically powered Peltier effect device to cool the fat.

The invention claimed is:

1. A method of removing fat floating on hot soup which comprises:
    providing a vessel having a base and an upstanding sidewall sealingly secured to the base, the base of the vessel being a thermally conducting metal plate having an upper side and a flat underside and the sidewall being made of plastic;
    placing ice within the vessel to cool the metal plate from its upper side to a temperature below that at which the fat solidifies;
    lowering the vessel to bring the flat underside of the plate into contact with the floating fat, whereby the fat congeals and adheres to the flat underside of the metal plate;
    raising the metal plate to remove the adhering fat from the soup, and
    scraping off the fat adhering to the flat underside of the metal plate by dragging the flat underside across an upper edge of a scraper member.

2. A method as claimed in claim 1, wherein the hot soup is in a pan, the periphery of the base is curved and non-circular, and the method comprises positioning the vessel in the pan with an edge region of the base close to a wall of the pan.

3. A method as claimed in claim 1, wherein the scraper member is a first wall of a stand also having a second wall spaced from the first wall, the second wall has an upper edge, and the method comprises resting the vessel on the upper edges of the first and second walls.

4. A method as claimed in claim 3, wherein the stand incorporates a container for collecting fat scraped off the base of the vessel.

* * * * *